L. C. PETERSON.
LOADING APPARATUS.
APPLICATION FILED DEC. 17, 1913.
1,115,241.
Patented Oct. 27, 1914.
2 SHEETS—SHEET 1.
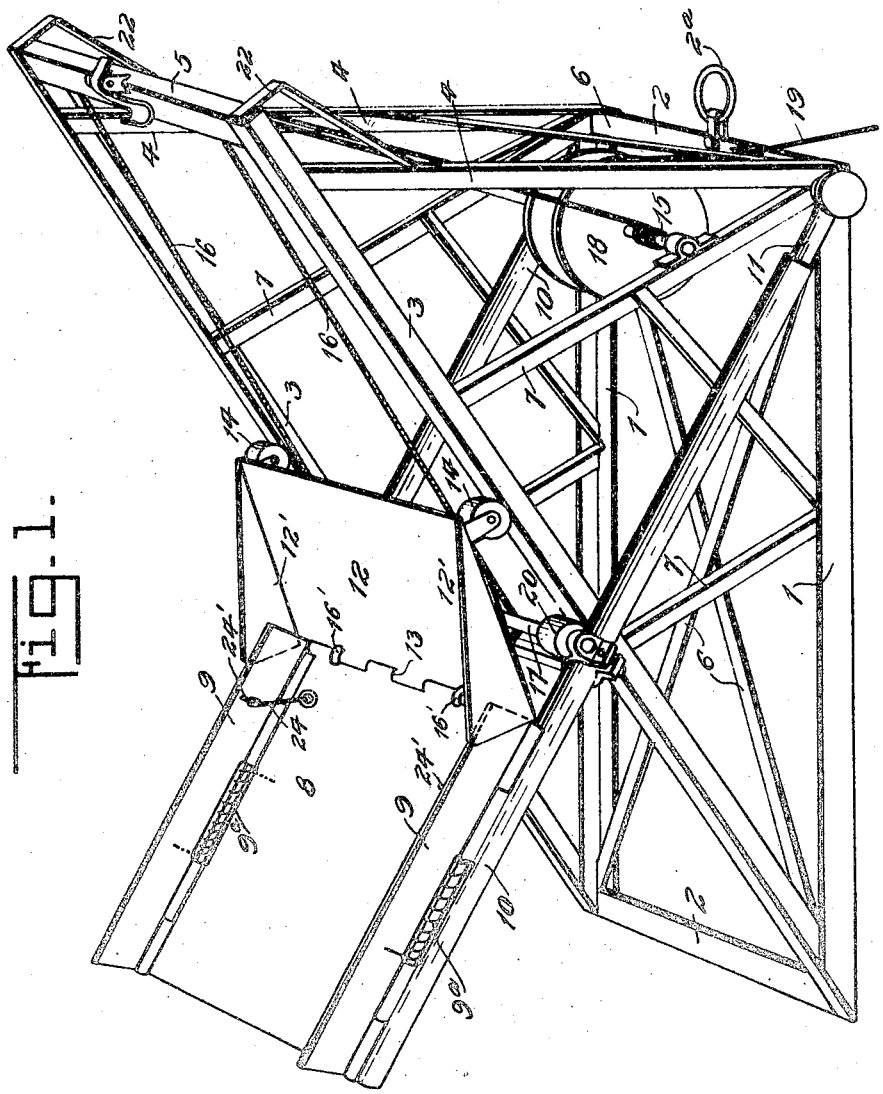

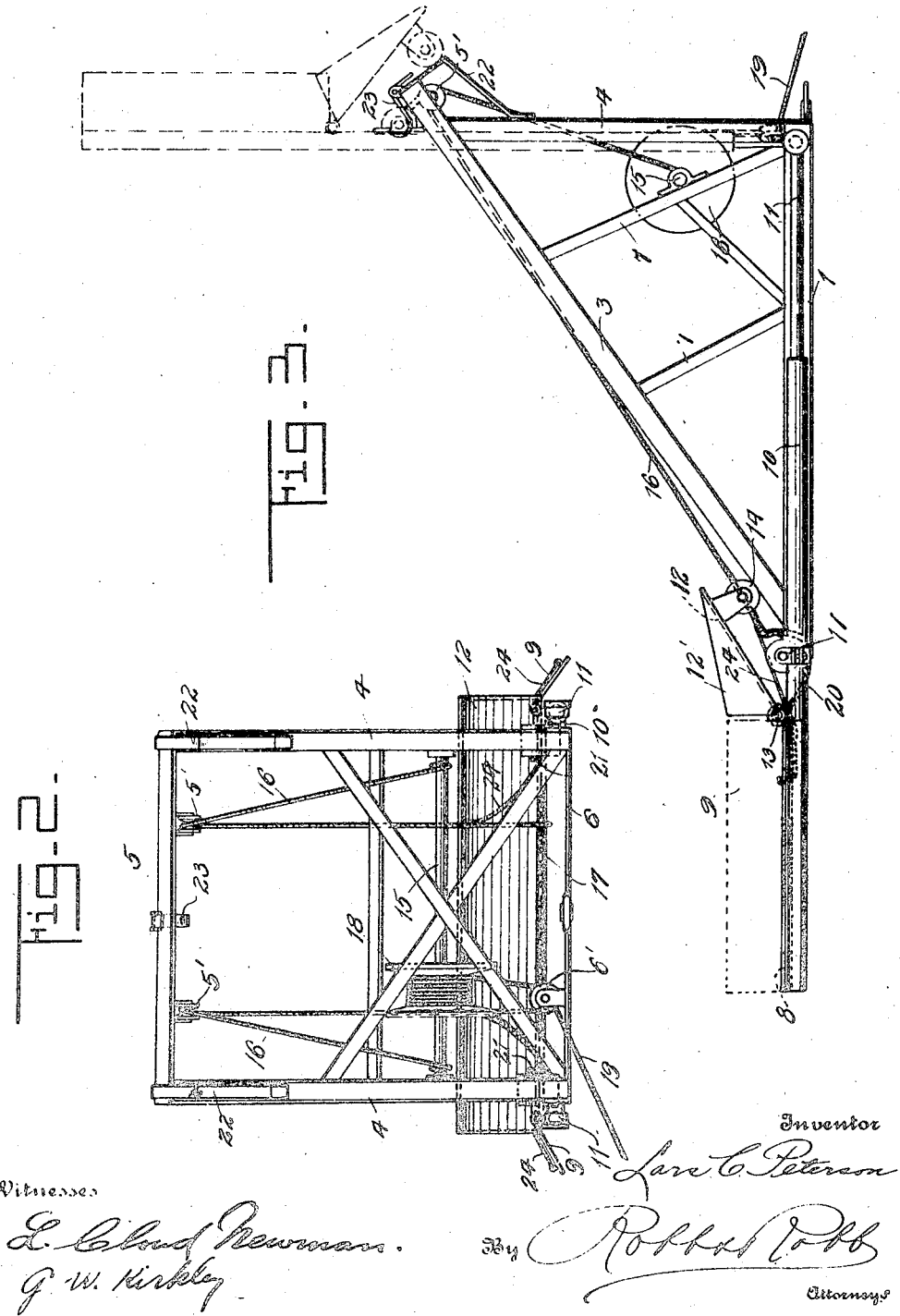

UNITED STATES PATENT OFFICE.

LARS C. PETERSON, OF OSAGE CITY, KANSAS.

LOADING APPARATUS.

1,115,241.

Specification of Letters Patent.

Patented Oct. 27, 1914.

Application filed December 17, 1913. Serial No. 807,278.

*To all whom it may concern:*

Be it known that I, LARS C. PETERSON, a citizen of the United States, residing at Osage City, in the county of Osage and State of Kansas, have invented certain new and useful Improvements in Loading Apparatus, of which the following is a specification.

The present invention involves certain improvements in loading apparatus, and while designed particularly for agricultural purposes to facilitate the loading of manure or the like into carts or other vehicles, the apparatus may be readily employed in various industries where a convenient and easily operable means for raising a load of material from the ground and delivering the same to an elevated point may be required.

Briefly speaking, the invention comprises a suitable framework adapted to rest upon the ground and embodying an inclined runway on which is adapted to travel a platform which is supported by telescopic arms connected with the frame. Associated with said platform is a chute located at one end of the same and adapted to direct the materials dumped from the platform to the point of deposit thereof.

In the drawings:—Figure 1 is a perspective view of an apparatus embodying the essential features of the invention. Fig. 2 is a front end view of the same. Fig. 3 is a side elevation of the apparatus showing the platform in its lowered horizontal position in full lines, and raised to dumping or delivery position in dotted lines.

The apparatus hereinafter set forth embodies especially certain features of improvement in the somewhat similar apparatus of my Letters Patent No. 918,695 issued to me April 20, 1909.

Throughout the following detail description, and on the several figures of the drawings, similar parts are referred to by like reference characters.

The framework of the apparatus of this invention may be said to comprise the spaced horizontal sills 1 connected at their opposite ends by the cross bars 2, the inclined runway consisting of the rails 3 connected with corresponding ends of the sills 1, and the vertical posts or bars 4 connecting opposite corresponding ends of the sills 1 with the upper ends of said rails 3. The rails 3 are connected together at their upper ends by a cross bar 5.

The framework just described is braced by means of the crossed bars 6 connecting the sills 1 together, and the inclined bars 7 extending upwardly from the sills and terminating at medial points in the lengths of the respective rails 3 to brace the latter effectively under the stress of the load that may be elevated by means of the platform 8. The platform 8 has the edge members 9 to prevent material thereon from being displaced except endwise of the platform. Telescopic arms are employed to support the platform 8 and comprise the outer tubular sections 10 and the inner sections 11, the latter being pivoted at the corners of the framework proximate to the points of connection of the members 1 and 4. The outer tubular sections 10 of the telescopic arms are freely slidable with respect to the sections 11 so that in the operation of the apparatus, when the platform 8 is being lowered in the manner illustrated in Fig. 1 of the drawings, the members 10 may gravitate downward by sliding action on the members 11.

A chute 12 is pivoted at 13 to the inner end of the platform 8 and is provided with flanges 12' corresponding with the members 9 of the platform and adapted to lap over the latter at the adjacent ends. At its free end the chute 12 carries the rollers 14 which are adapted to move along the rails 3 in an evident manner.

The means for raising the platform 8 and its chute 12 comprises a winding shaft 15 supported by two of the foremost bracing bars 7 of the framework and having cables 16 adapted to wind at one end thereon, the opposite end of each cable extending to and being connected by hooks 16' to the platform 8 and passing under a transverse bar 17, the opposite ends of which are attached to the members 10 of the telescopic arms. To the shaft 15 is secured an operating drum 18 about which a cable 19 is adapted to wind, said cable leading off to any suitable actuating means or being connected with draft animals as desirable. The cable 19 winds about the drum 18 in a direction opposite to that in which the cables 16 wind about the shaft 15 so that it will be obvious that by forcibly unwinding the cable 19 from the drum 18 the cables 16 will be wound on the shaft 15 thereby exerting an upward pull on the bar 17 and raising the platform 8. To facilitate the movement of the platform upwardly in respect to the runway of the framework, rollers 20 are mounted upon the bar 17 as an axis and are adapted to freely travel along the rails 3. The rollers 20 are maintained in their proper positions on the bar 17 by means of collars 21 at the inner sides of the rollers, and by the members 10 at their outer sides, these two parts forming stops for the purpose mentioned.

During the operation of elevating the platform 8 the chute 12 moves pivotally so that when the platform is near the top of the runway said chute is practically at a right angle to the platform and remains in said position until carried beyond the cross bar 5, whereupon the chute moves downward to the delivering inclined position illustrated in dotted lines in Fig. 3, being supported in such position by means of the brackets 22 which connect the upper ends of the rails 3 with the posts 4, said brackets being of somewhat angular form.

The difference in the diameters of the shaft 15 and drum 18 permits of the operation of raising the platform 8 carrying a full load, at the expense of a comparatively small amount of power. The return movement of the platform 8 is, of course, effected by gravitation of the same to its horizontal position. It is preferred that the framework be constructed primarily of angle iron of which most of its parts are made, though any suitable construction members may be utilized within the purview of the invention.

In order to hold the platform 8 in upright out-of-the way position as shown in dotted lines in Fig. 3, as when the apparatus is not being used, a hook 23 is pivoted to the cross bar 5 and adapted to engage the member 17 on the arm sections 10. This hook is manually operable to engage member 17 but will gravitate out of engagement upon slight forward movement of the parts of the arm sections 10 and thus release the platform permitting it to return to its normal position. The members 9 above mentioned are pivoted to the edges of the platform 8 and springs 9ᵃ coact therewith to force said members 9 into the outwardly inclined positions shown in Figs. 2 and 3, when the platform is lowered. When so arranged the members 9 form skids up which a scraper is adapted to pass onto the platform to dump its load preliminary to elevation of the latter. To the cables 16 are attached light ropes or connections 24 that lead through openings in the platform 8 to points of connection 24′ with the members 9. Thus it is that when the platform 8 is raised slack in the cables 16 (see Fig. 4) is taken up and the tension on the connections 24 causes the members 9 to be raised to approximately vertical positions at opposite sides of the load on the platform, whereby they will prevent the lateral displacement of the load in an obvious manner. The springs 9ᵃ will restore the members 9 on the subsequent movement of the platform to the ground. The cables 16 pass over pulleys 5′ on the bar 5, and the cable 19 under a pulley 6′ on the bar 6, and draft animals may be hitched to a ring 2ᵃ on the bar 6 to pull the apparatus from one field to another.

Having thus described the invention, what is claimed as new is:—

1. In loading apparatus, the combination of a framework comprising inclined rails, a platform adapted to receive a load thereon and to travel up the rails, arms mounted on the framework and connected with the platform, means for raising the arms and thereby elevating the platform, movably mounted members at opposite edges of the platform adapted to form skids or inclines when the platform is in charging position, means connecting the edge members with the said raising means whereby the edge members are caused to project upward from the platform to prevent displacement of the material on the latter during the operation of elevating the same, and spring means for restoring the said edge members on return of the platform to its normal charging position.

2. In loading apparatus, a framework, a platform adapted to assume a position on the ground adjacent to the framework, members pivoted to opposite edges of the platform and normally inclining downward therefrom, hoisting cables connected with the platform to raise the same on the framework, and means intermediate the cables and the said edge members to raise the latter so that they project upward from the platform during the raising movement of the said platform, and consisting of connections attached to the cables and leading through the platform and connected with said edge members.

In testimony whereof I affix my signature in presence of two witnesses.

LARS C. PETERSON.

Witnesses:
 BLANCHE BAILEY,
 F. G. HOLMES.